(12) United States Patent
Leskiw

(10) Patent No.: US 9,198,362 B2
(45) Date of Patent: Dec. 1, 2015

(54) COLLECTION AND DISTRIBUTION OF PLANT MATERIAL

(71) Applicant: Leonard Leskiw, Edmonton (CA)

(72) Inventor: Leonard Leskiw, Edmonton (CA)

( * ) Notice: Subject to any disclaimer, the term of this patent is extended or adjusted under 35 U.S.C. 154(b) by 24 days.

(21) Appl. No.: 13/739,032

(22) Filed: Jan. 11, 2013

(65) Prior Publication Data

US 2014/0196641 A1     Jul. 17, 2014

(51) Int. Cl.
*A01G 1/00* (2006.01)
*A01C 7/00* (2006.01)

(52) U.S. Cl.
CPC .. *A01G 1/00* (2013.01); *A01C 7/008* (2013.01)

(58) Field of Classification Search
CPC ......... A01G 1/00; A01G 1/001; A01G 1/002; A01G 1/004; A01C 1/00; A01C 7/00; A01C 7/008; A01C 14/00

USPC ......... 111/200, 900, 901, 902, 906, 915, 918, 111/919

See application file for complete search history.

(56) References Cited

U.S. PATENT DOCUMENTS

| | | | | | |
|---|---|---|---|---|---|
| 2,768,570 | A | * | 10/1956 | Strid | 172/19 |
| 2,998,081 | A | * | 8/1961 | Hartmangruber et al. | 172/20 |
| 4,063,384 | A | * | 12/1977 | Warren et al. | 47/58.1 R |

* cited by examiner

Primary Examiner — Christopher J Novosad
(74) Attorney, Agent, or Firm — Davis & Bujold, P.L.L.C.; Michael J. Bujold

(57) ABSTRACT

A method of reclaiming disturbed land including designating an area of land with propagules as a source area and collecting a portion of the propagules from the area. A portion of the propagules are distributed on disturbed land. Propagules are collected by taking cores or elongate sections of material from the source area using cutting elements such as core tubings or cutting discs.

7 Claims, 4 Drawing Sheets

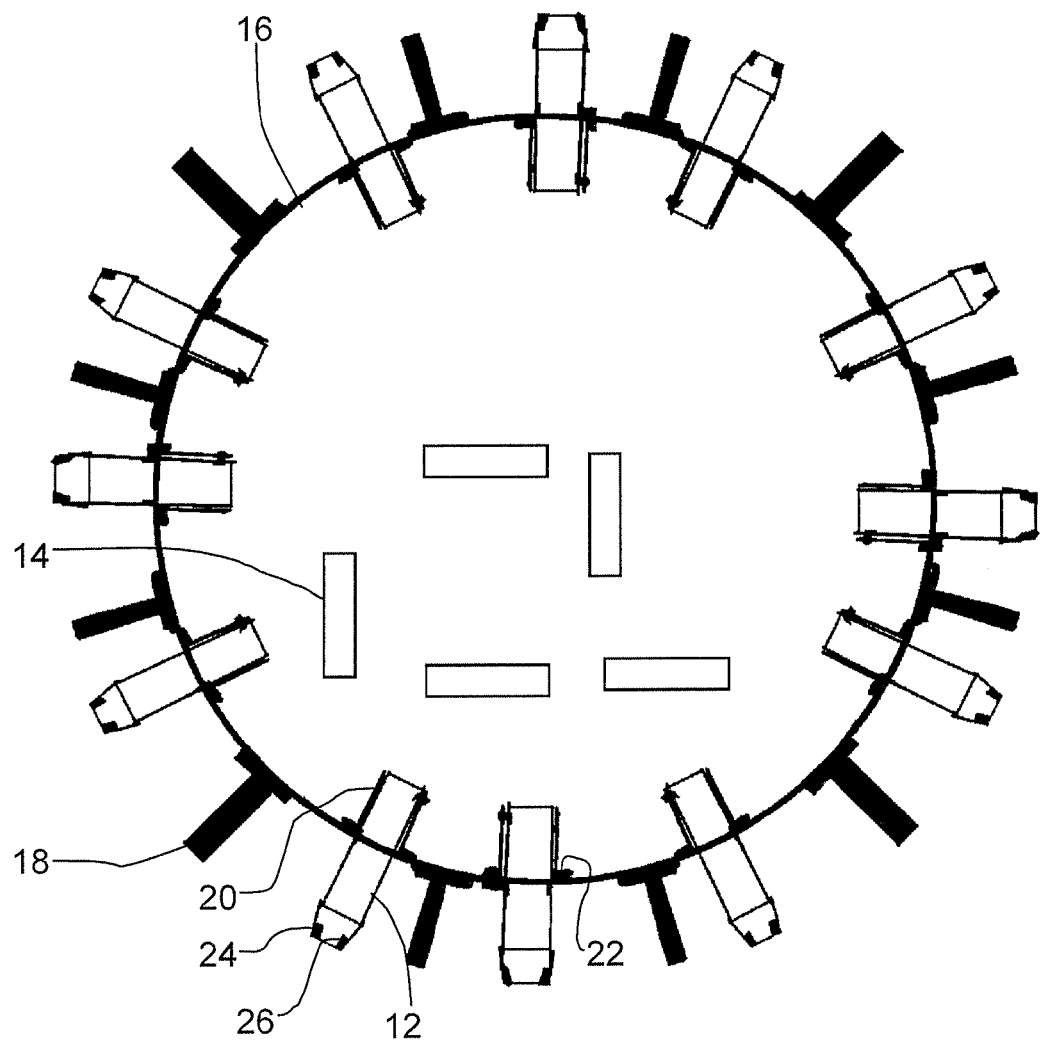
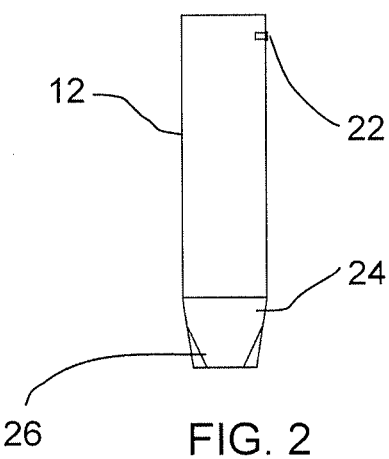
FIG. 1
FIG. 2

COLLECTION AND DISTRIBUTION OF PLANT MATERIAL

FIELD

This relates to a method of collecting and distributing plant material and an apparatus for collecting the plant material.

BACKGROUND

After operations on sites used for mines, pipelines, wellsites, gravel pits, borrow pits, landfills, and other disturbances, it is necessary to reclaim the land.

This generally involves establishing plants like those grown in similar ecosystems, such as forest ecosystems in the oilsands and native grass land ecosystems on pipelines, wellsites, etc. on the prairie. Presently, such "transplanting" is typically accomplished by salvaging the soil surface (15 to 20 cm), transporting it and spreading it on the reclaimed land surface. It takes about 1 ha of salvage to reclaim 1 ha of land. Alternatively, a diversity of targeted understory species can be established by collecting seeds, growing them in a nursery, and planting them on the reclaimed landscape. While these methods work reasonably well they are time consuming and expensive. The salvage operation is destructive in that an area can only be scraped once then all the seed stock and propagules are removed. Seed collection through to propagation and planting is very time consuming, labor intensive, and expensive.

SUMMARY

There is provided a method of reclaiming disturbed land that includes designating an area of land with propagules as a source area. A portion of the propagules is collected from the source area and distributed on disturbed land.

In one embodiment, the portion of the propagules collected from the source area is from 20% or less of the source area.

In another embodiment, the portion of propagules collected from the source area is collected from 10% or less of the source area.

In one embodiment, a further step of collecting a further portion of propagules from the source area is included. This step may be completed after a period of recovery time for the source area.

In one embodiment, propagules are collected from the source area using a coring tube.

In another embodiment, propagules from the source area using cutting discs.

In an embodiment, the propagules are at least one of seeds, roots, rhizomes, seedlings and soil fauna.

There is further provided an apparatus for collecting propagules that includes a plurality of coring tubes carried by a tube carrier. The tube carrier introduces the coring tubes into a ground surface to collect propagules from the ground surface. A receiver for receiving the propagules is collected by the coring tubes.

In one embodiment, the tube carrier comprises a rolling vessel.

In one embodiment, the tube carrier has protective protrusions adjacent to the coring tubes.

In an embodiment, the coring tubes extend between 5 and 15 cm from the tube carrier.

In an embodiment, the coring tubes are 10% or less of the surface area of a collection portion of the tube carrier.

There is further provided an apparatus for collected propagules that has one or more pairs of cutting discs that include a first disc and a second disc. The first disc and the second disc are angled relative to the other disc such that each pair of cutting discs cuts an elongate section of material from a ground surface ad lifts the elongate section of material above ground. The elongate sections have propagules. A receiver is provided for receiving the propagules collected by the one or more pairs of cutting discs.

In an embodiment, one or more pairs of cutting discs cut an elongate section of material that is between 5 and 15 cm wide.

In an embodiment, a plurality of pairs of cutting discs are carried by the disc carrier. The pairs of cutting discs are at least 5 times greater than the width of the elongate section of the material cut by the pair of cutting discs.

In an embodiment, the second disc trails the first disc.

In another embodiment, the first disc is straight relative to the direction of travel, and the second disc is curved relative to the direction of travel.

There is further provided an apparatus for collecting propagules that has a plurality of cutting elements spaced in a direction perpendicular to a direction of travel. The cutting elements cut an elongate section of material from a ground surface while leaving the ground surface outside the elongate section of material and between cutting elements undisturbed. The cutting elements are shaped to lift the cut elongate section of material out from the ground. A receiver is provided for receiving the elongate section of material cut by the cutting elements.

In an embodiment, each cutting element comprises two or more cooperating elements.

In one embodiment, the cooperating elements are discs.

In one embodiment, the second disc trails the first disc.

In an embodiment, the first disc is straight relative to the direction of travel and the second disc is curved relative to the direction of travel.

In another embodiment, each cutting element cuts an elongate section of material that is between 5 and 15 cm wide.

In an embodiment, the spacing between cutting elements is at least 5 times greater than the width of the elongate section of material cut by the cutting elements.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is an example of a machine with coring tubes used to collect propagules.

FIG. 2 is a side elevation view of the coring tube used in the machine shown in FIG. 1.

DETAILED DESCRIPTION

Figure 3:
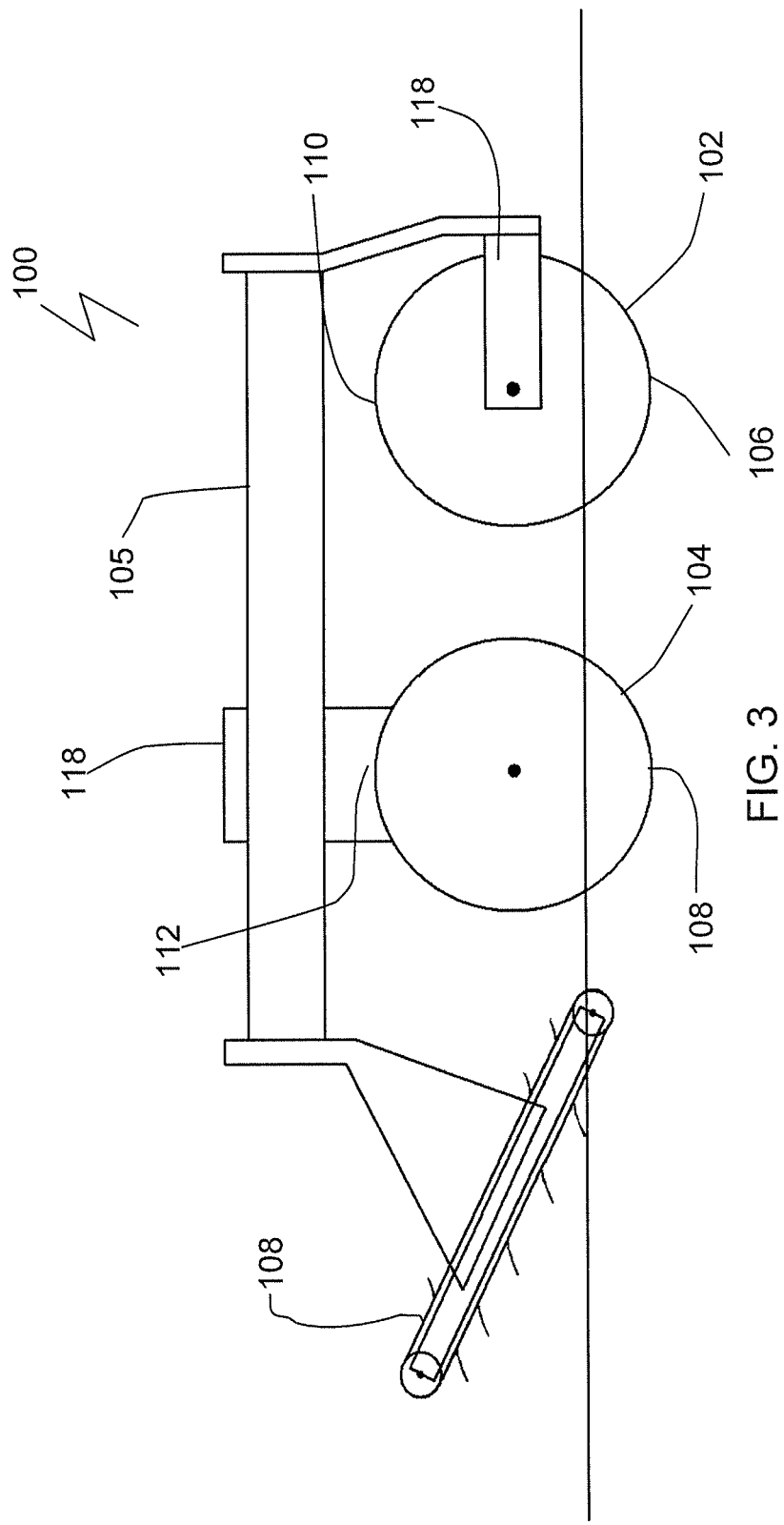
FIG. 3 is a side elevation view of a machine with cutting discs used to collect propagules.

The presently described apparatus is intended to be used for collecting soil litter and other material containing propagules (seeds, roots, rhizomes, seedlings, and soil fauna) from soil surfaces that are suitable for establishing an appropriate ecosystem in the area to be reclaimed. After collecting the material, it is transported to its destination and the material is spread on the lands being reclaimed to establish plants like those grown in the source area. Preferably, the propagules will be from plant species that were similar to those found before the disturbance occurred.

The apparatus and method allows repeated collection from the same source area (natural nursery) repeatedly within a shorter time frame than is otherwise possible, such as multiple times in a year or in subsequent years to provide a supply of propagules for placement on reclaimed lands. A "nursery" site can be set aside for repeat collection of material, much like a sod farm process. For example, it is envisioned that a 10 ha nursery could supply sufficient material to replant at least 100 ha per year on an ongoing basis. As only a portion of the propagules are taken from this site, the removed material from the nursery site can be infilled naturally by the surrounding plant growth over time. Furthermore, as the removed material will act as seed or starter material, it is not necessary to completely cover the disturbed lands with the materials (e.g. the portion of material that is removed from 1 ha of a nursery site may be sufficient to cover 1 ha of disturbed land). Field testing may be used to determine the optimum ratio of source to destination area in the various circumstances in which this method may be used, such as the type of land being recovered, the type of propagules being collected, any time or seasonal constraints, etc. as well as the time required to allow the nursery site to recover.

There are many different possible machines that may be used to collect the necessary propagules. In many circumstances, the material of interest will be found within a depth of 5 to 15 cm from the top surface. The method is intended to primarily collect propagules (e.g. primarily the litter on the ground surface, which may include seeds, roots, rhizomes, seedlings, soil fauna, etc.). While a portion of the mineral top soil may be collected, the primary concern is to capture material from which plants will reproduce.

Two approaches to collecting the propagules are discussed below. The first uses a coring tube to collect discrete portions (e.g. "plugs") of material, while the second uses cutting discs to collect an elongate section of material.

Coring Tube

There are various possible configurations in which coring tubes 12 may be carried by a tube carrier. For example, referring to FIG. 1, coring tubes 12 may be mounted about the circumference of a rolling vessel 16, such as a wheel, pipe or other cylinder. Coring tubes may also be positioned on the bottom surface of a step plate, etc. (not shown). Each of these will carry a series of coring tubes 12 that are inserted into the land surface to a desired depth (usually 5 to 15 cm), repeatedly, while moving across the terrain. Referring to FIG. 1, the cored material 14 is collected, such as by being fed through coring tubes 12 that empty into vessel 14 or by a conveyor and transferred to a holding tank (not shown). The collected material may then be transferred to a transport truck or compactor for delivery to the reclaimed site where it is applied to the land surface by spreading, broadcasting, blowing, dribbling, or other appropriate methods. Other methods of collecting and transporting material once removed from the source ground will be apparent to those skilled in the art.

Referring to FIG. 1, vessel 16 carries a plurality of coring tubes 12 mounted about the circumference of vessel 16. It will be understood that coring tubes 12 may also be placed along the length of vessel 16 to provide a wider area of coverage. The number and placement of coring tubes 12, as well as the relative dimensions of coring tubes 12 and vessel 16, may vary from the depicted example, which is used for illustrative purposes only. The vessel 16 preferably has a diameter of about 1 to 1.5 m and resembles a sheep's foot packer. Vessel 16 has solid metal spikes 18, in addition to coring tubes 12 mounted on the outer surface of vessel 16. Coring tubes 12 surface with openings into the vessel 16. As the vessel 16 is rolled, the coring tubes 12 penetrate the surface, coring tubes 12 extracts material, and with each rotation additional material is picked up and fed into the vessel 16. The spacing between coring tubes 12 on vessel 16 determines the amount of material collected from the source area, depicted as cored material 14. When vessel 16 is filled it is unloaded in the transport/compactor truck for delivery. The machine is designed such that solid metal spikes 18 are strategically placed around each coring tube 12 to protect it by raising the entire apparatus if a stone, root, stump or other impenetrable obstacle is encountered. While straight spikes are depicted, other shapes may also be used. Furthermore, each coring tube 12 is preferably mounted inside a sleeve 20 and held by a shear bolt 22, or other tripping, spring or hydraulic mechanism to further protect the coring tube 12 should it strike a solid object. Referring to FIG. 2, the coring tube 12 also has a removable screw-on tip 24 that can be replaced when worn or damaged. This tip 24 has a lip 26 on the inside to prevent the material 14 from dislodging outwardly. Tip 24 and coring tube 12 diameters can vary from about 5 to 15 cm, as can the depth.

In one example, rotating vessel 16 described above may resemble a steel wheel with spikes, like an old steel wheeled tractor rear wheel, with coring tubes inset on the rim with attached delivery tubes extending from the coring tubes in the rim to near the hub where they curve outward and empty into a conveyor which then transfers the material to a trailing hopper or tank.

Another example (not depicted) may include a step plate configuration that has a series of coring tubes inserted in a horizontal sectional beam that may be hydraulically inserted into the land surface, before being lifted, moved forward, stopped, and inserted again. Delivery tubes may be attached to the coring tubes to feed into a hopper or conveyor, or the coring tubes may feed directly into another type of container. In this configuration, the hydraulic pressure applied to the coring tubes is preferably large enough to be inserted into the ground, but not sufficient to cause damage to the coring tube if an obstacle is encountered.

All the coring devices are preferably designed to extract about 10% or less of the surface area at one time. Repeated extractions will remove soil from an undisturbed surface. After a year or two, the cored sites will infill with new litter and growth, thereby extending the life of the nursery.

Cutting Elements Option

Figure 4:
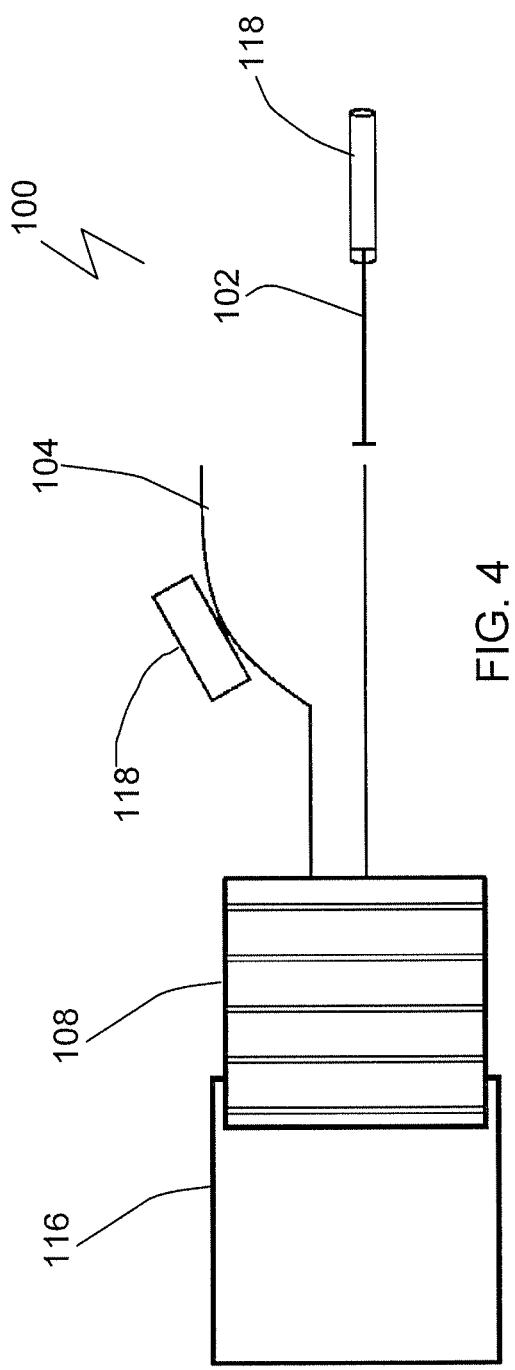
FIG. 4 is a top plan view of the machine with cutting discs shown in FIG. 3.

A further example is shown in FIG. 3-6. In this example, there is an apparatus 100 that uses cutting discs to remove propagule material as an elongate section 106, as shown in FIG. 4. These discs may be carried by coulters 118, such as those used in air seeders or other tillage implements. Other disc carriers may also be used as will be recognized in the art.

While various arrangements may be used to cut an elongate section of material, the depicted example uses a straight cutting disc 102 and a curved cutting disc 104. Referring to FIG. 4, cutting discs 102 and 104 are offset or spaced relative to each other in directions parallel to the direction of travel and perpendicular to the direction of travel. Straight disc 102 leads, perpendicular to the ground surface, with curved cutting disc 104 offset and trailing straight disc 102. As can be seen in FIG. 4, straight disc 102 turns on an axis that is perpendicular to the direction of travel, and, referring to FIG. 5, makes a straight cut while curved cutting disc 104 completes elongate section 106 by cutting down and under to meet the bottom of elongate section 106. As shown in FIG. 4, curved disc 104 rotates on an axis that is not perpendicular to the direction of travel such that the leading, cutting edge enters the ground parallel to the direction of travel, and such that, once elongate section 106 has been cut, it is lifted out of the ground by the trailing edge of disc 104. In another example (not shown) discs 102 and 104 may both be angled, such as in a "V" configuration to cut a corresponding groove in the ground, where discs 102 and 104 nearly touch at the bottom of their rotation and are widely separated at the top to form a V-like configuration. Other design changes will be apparent to those skilled in the art. For example, both discs may be straight or both may be curved. Discs 102 and 104 may also be placed immediately adjacent rather than offset, although in some circumstances this may interfere with the removal or collection of material in elongate section 106. It will also be understood that, while preferably, discs 102 and 104 need not complete the cut at the bottom of elongate section 106, as the movement of discs 102 and 104 may be used to pull elongate section 106 out of the ground and separate any remaining material. Furthermore, rather than discs, other types of cutting implements may be used to cut elongate sections of material from the ground, such as blades that are pulled through the ground.

Referring to FIG. 4, elongate sections 106 may be collected and transferred to a trailing hopper 116 using a conveyor 108. In one example, the mounting may have a safety mechanism to avoid damage, such as a trip mechanism so that if the leading edge of the pickup hits an obstacle it would be able to "kick back" and not be damaged. In another example, there may be a soil lifting device just in front of the pickup to assist in raising the soil off the ground onto the pickup. For example, there may be two parallel wheels with spring tines that lift the soil onto the pickup, similar to wheel hay rake type of tines, although the wheel rake design is generally used to gather and roll hay into a swath. The actual collection method and design may vary as will be recognized by those skilled in the art.

Figure 5:
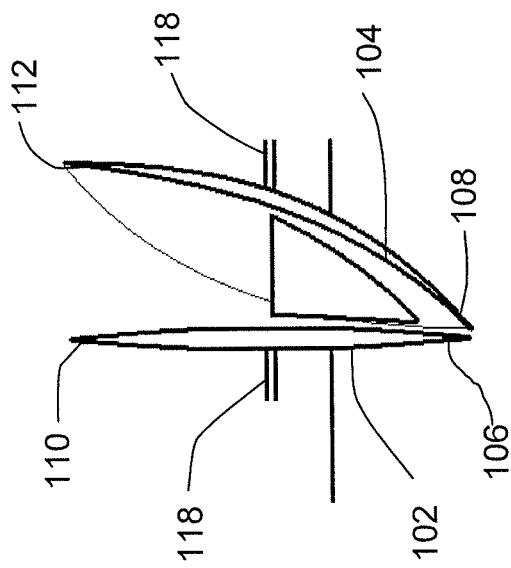
FIG. 5 is a front elevation view of the cutting discs used in the machine shown in FIG. 3.
Figure 6:
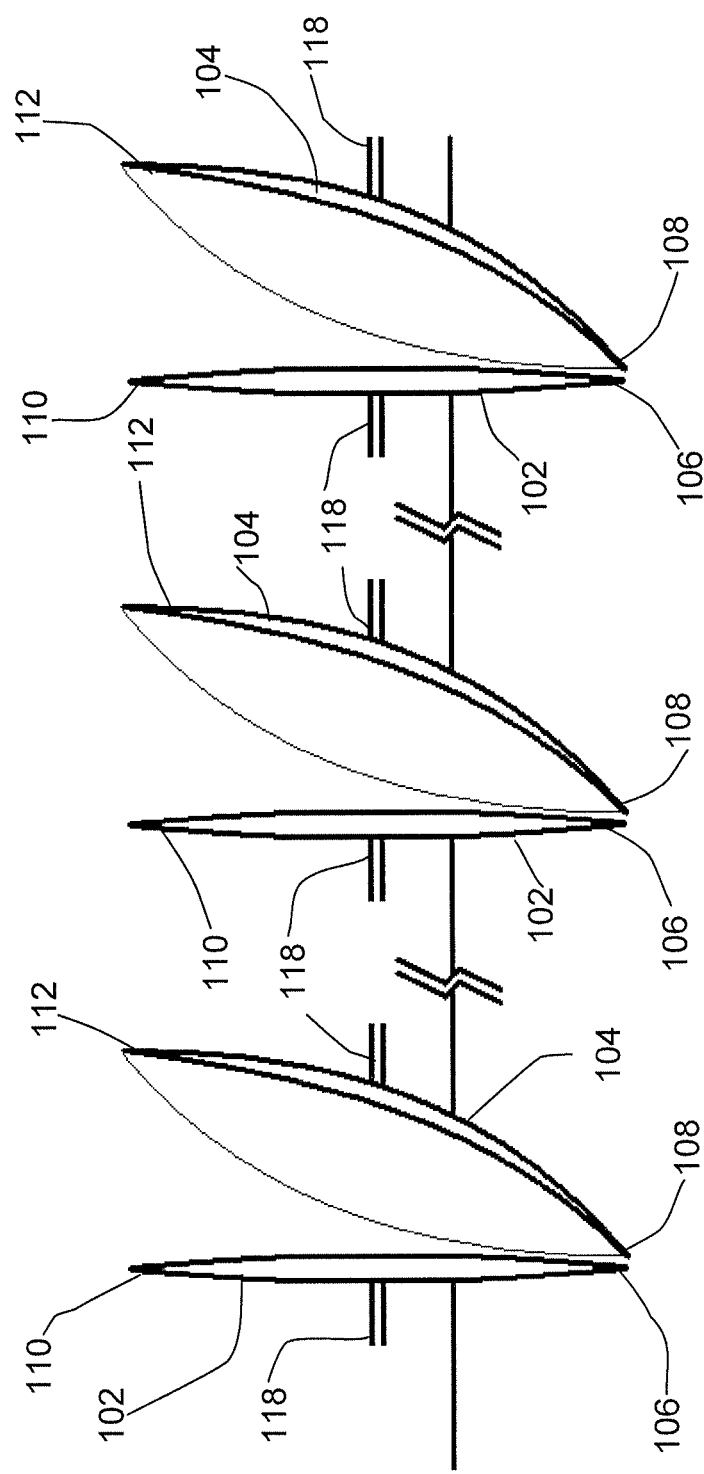
FIG. 6 is a front elevation view of a plurality of cutting discs shown in FIG. 5.

Referring to FIG. 6, a plurality of pairs of cutting discs 102 and 104 may be connected to a disc carrier (not shown), to allow for several elongate sections 106 of material to be taken at the same time. For clarity, only the axle of coulter 118 is shown in FIGS. 5 and 6. In one example 10 cm wide elongate sections may be removed at a spacing of about 50 cm apart. This would leave at least 80% on the source area undisturbed and allow natural recovery of the source area and permit repeated collection over a period of time. It will be understood that apparatus 100 may be designed to remove different width ribbons and at different spacings. The cutting discs 102 and 104 are preferably mounted with spring trip mechanisms so that if the cutting discs 102 and 104 hit a solid object they will "ride over" the obstacle and not be damaged. These are commonly used in coulters 118 used to carry discs for agricultural purposes.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples, but should be given the broadest interpretation consistent with the description as a whole.

What is claimed is:

1. A method of reclaiming disturbed land, the method comprising the steps of:
    designating a natural forest ecosystem comprising propagules as a source area;
    collecting a portion of the propagules from the source area, the propagules being collected in a disturbed pattern throughout the source area, the propagules being comprising two or more of seeds, roots, rhizomes, and seeding from the source area; and
    distributing the portion of the propagules on the disturbed land.

2. The method of claim 1, wherein thedistrubted pattern comprises 20% or less of the source area.

3. The method of claim 1, wherein the disturbed pattern comprises 10% or less of the source area.

4. The method of claim 1, further comprising the step of collecting a further portion of the propagules from the source area after a period of recovery time sufficient to permit the source area to regenerate the removed propagules.

5. The method of claim 1, wherein collecting a portion of the propagules comprises collecting propagules using a coring tube.

6. The method of claim 1, wherein collecting a portion of the propagules comprises collecting propagules using cutting discs.

7. The method of claim 1, wherein the propagules further comprise soil fauna.

* * * * *